United States Patent [19]
Johnson

[11] Patent Number: 4,966,718
[45] Date of Patent: Oct. 30, 1990

[54] CROSS FLOW FILTER METHOD

[76] Inventor: Willard L. Johnson, 12923 W. Lincoln Ave., Huntington Woods, Mich. 48070

[21] Appl. No.: 322,647

[22] Filed: Mar. 13, 1989

Related U.S. Application Data

[63] Continuation-in-part of Ser. No. 205,456, Jun. 10, 1988, which is a continuation-in-part of Ser. No. 120,581, Nov. 19, 1987, Pat. No. 4,859,332, which is a continuation-in-part of Ser. No. 24,383, Mar. 19, 1987, abandoned.

[51] Int. Cl.⁵ .............................................. B01D 45/04
[52] U.S. Cl. .................................... 210/776; 210/791; 210/800; 210/805; 210/808; 210/346; 210/486
[58] Field of Search ............... 210/776, 791, 805, 806, 210/333.1, 333.01, 346, 486, 487, 800, 808

[56] References Cited

U.S. PATENT DOCUMENTS

| 3,635,343 | 1/1972 | Holland | 210/406 |
| 4,085,051 | 4/1978 | Kaminsky et al. | 210/411 |
| 4,116,838 | 9/1978 | Lazzarotta | 210/333.01 |
| 4,213,861 | 7/1980 | Muller et al. | 210/333.1 |
| 4,468,319 | 8/1984 | Laaksa | 210/333.01 |
| 4,519,903 | 5/1985 | Johnson | 210/307 |
| 4,579,656 | 4/1986 | Johnson | 210/234 |
| 4,790,935 | 12/1988 | Johnson | 210/232 |

FOREIGN PATENT DOCUMENTS 2094653  9/1982  United Kingdom .

Primary Examiner—Richard V. Fisher
Assistant Examiner—Wanda L. Millard
Attorney, Agent, or Firm—Basile and Hanlon

[57] ABSTRACT

The cross flow filter method includes an open tank having a first liquid retaining section, a second filter retaining section and a third solids collecting section in fluid communication with each other. A filter assembly is retained within the second section and includes a filter panel having a generally vertically disposed porous media surface. Filtrate is removed by applying very low vacuum pressure in communication with the filter panel such that filtrate is drawn through the pores of the filter media surface at a flow rate $Q_{out}$. Fluid to be filtered is simultaneously cross flowing vertically downward across the filter media surface at a flow rate $Q_x$, such that the horizontal velocity $V_h$ of fluid drawn through the filter media surface is very slight with respect to the vertical velocity $V_v$ of the cross flowing unfiltered fluid. The high velocity cross flowing unfiltered fluid imparts force and velocity to particles in the cross flow stream, thereby carrying the particles past the filter media surface without allowing the particles to adhere to the media surface. Excess unfiltered cross flowing fluid is recirculated between the first and second sections of the tank, while allowing entrained particles to settle to the solids collecting section of the tank as the recirculated fluid mixes with incoming unfiltered fluid prior to recirculation and discharge vertically downward across the filter media surfaces.

20 Claims, 3 Drawing Sheets

CROSS FLOW FILTER METHOD

RELATED APPLICATIONS

This application is a continuation-in-part of copending patent application Ser. No. 205,456 filed June 10, 1988 which is a continuation-in-part of co-pending patent application Ser. No. 120,581 filed Nov. 19, 1987, which is now U.S. Pat. No. 4,859,332, which is a continuation-in-part of co-pending patent application Ser. No. 024,383 filed Mar. 19, 1987 which is now abandoned.

FIELD OF THE INVENTION

This invention relates to a filter apparatus and, in particular, to a filter apparatus having vacuum filter panels disposed in a cross flowing fluid stream.

BACKGROUND OF THE INVENTION

My prior United Kingdom patent application, GB 2 094 653 A published on Sept. 22, 1982, discloses parallel filters which are alternately communicated with two separate manifolds by means of a valve which passes filtrate selectively from one of the manifolds to a pump and discharge ducts. When sufficient liquid has been fed to the filter tank, the pump is operated to draw filtrate from one of the manifolds. When a vacuum gage senses a reduced flow rate from one manifold, the timer controlled valve moves to draw filtrate from the other manifold and actuates a second valve to cause a pulsed back flow in the first filter set to clean the filter media. If the liquid level in the tank falls, a third valve diverts the discharge from the pump back into the tank. Sludge is removed from the bottom of the tank by simply draining off or by a conveyer. The filter units include filter cloth covering an expanded metal panel fitted onto a manifold coupling. The filter unit is sealed against the manifold by a ring seal compressed under the weight of the filter unit or by clamps for the filter unit. The external surface of the filters can be fitted with flat or curved louvers. A magnetic bar can also be provided at the top of the filter units so that they can be removed by a magnetic hoist. A fourth valve mechanism in the manifold is opened automatically when the filter is fitted on the manifold.

My prior U.S. Pat. No. 4,591,903 discloses a suction-type filter machine having a plurality of filter leaves. Each filter leaf includes a core panel of egg-crate type walls defining transverse passageways through the panel and openings through the walls to provide vertical, horizontal and longitudinal passageways for filtrate flow. The filtrate is drawn through the filter medium enwrapping the core panel by a suction pump. A conduit conductor encloses an edge portion of the core panel for communicating the filtrate flow from the interior of the core panel through a manifold connected with the suction end of the filtrate pump. The effluent to be filtered is charged into the tank of the filter machine from above the filter leaves or units, so that there is a continuous downward flow of polluted liquid and its entrained solids from the input opening to the solid discharge portion of the filter machine. The filter machine can continuously filter a very large volume of polluted liquid and simultaneously separate the solids therefrom for discharge to the settling tank portion of the machine. The relatively close spacing between the side-by-side proximity of the filter units, one with another, is governed by the diameter of the filter medium covered discharge tube or conduit mounted on and at one end of the filter core panel. The filter machine has substantially zero flow of liquid below the filter units, thereby allowing the solid particulates to settle readily to the bottom of the filter tank. The filter leaf core panels can easily be removed from the machine by merely picking them up from their positions of rest upon the supporting manifolds in the tank.

My prior U.S. Pat. No. 4,579,656 discloses a leaf-type filter system, in which a suction pump is employed to pump filtered fluid from a series of individual filter leaves connected to an individual leaf chamber via a fluid coupling located above the surface of fluid being filtered. The couplings are of inverted U-shape and have a sliding sealing fit with the vertical outlet tube of a filter leaf and a vertical receiving tube mounted in a manifold or header external of the main filter tank. Identical individual filter leaves are formed in a rectangular configuration of relatively narrow lateral thickness. Along one vertical side edge of the leaf, a cylindrical coupling tube is mechanically attached to the core of the leaf and is in fluid communication with the internal chamber defined by the leaf core to constitute the outlet tube for conducting filtrate from the leaf. The outlet tube projects upwardly above the horizontal upper surface of the rectangular leaf and, when located in the filter tank, the upper end of the outlet tube projects above the surface of fluid to be filtered contained in the tank. The diameter of the leaf outlet tube is made larger than the lateral thickness of the leaf. The interchangeable leaves are placed into the tank with the outlet tubes of alternate leaves at opposite sides of the tank. Vertical guides on the inner sides of the tank are employed to locate the outlet tubes laterally along the walls. The relatively thin, vertical end edge of one leaf is engaged between the outlet tubes of the two adjacent leaves in side-by-side relationship with a spacing between the leaves determined by the amount by which the outlet tube diameter exceeds the lateral thickness of the leaf itself. A closed manifold is located on opposed outer sides of the main filter tank. Receiving tubes opening into the interior of the manifold project upwardly through the upper wall of the manifold and are located to be in alignment with the respective outlet tubes of the filter leaves. The individual outlet tubes of the filter leaves and the associated receiving tube of the adjacent manifold are detachably coupled to each other by an open-ended coupling tube of inverted U-shaped configuration. The opposed ends of the U-shaped coupling tube are dimensioned to slidably fit into the upper ends of a filter leaf outlet tube and its associated receiving tube to thus place the interior of the manifold in fluid communication with the outlet tube of the leaf. A suction pump connected to each manifold establishes fluid flow of filtrate from the leaves to the outlet tube, coupling tube and manifold for transfer to a collection point. The individual leaves are easily removed and replaced by manually lifting the coupling tube to slip it off the outlet tube of the leaf and the receiving tube of the header, at which time the leaf is available for manual removal.

Many of the known leaf-type filter machines have short operating cycles because the solid particulates must collect on the filter medium, clogging the openings, which results in the rapid build-up of a cake on the filter and correspondingly reduces the amount of filtrate flow. Tremendous amounts of time are consumed in shutting down the filter machines and cleaning the cake from the filters. The present invention provides increased operating cycles with more efficient filtration characteristics. The present invention is capable of filtering submicron and larger particles from large volumes of fluid in a relatively small compact apparatus. The present invention also provides relatively light weight filter panels that are inexpensive to manufacture and maintain. The filter panels of the present invention also include the feature of easily replaceable filter media sheets.

SUMMARY OF THE INVENTION

The present invention of a cross flow filter apparatus includes a tank having a first liquid retaining section, a second filter retaining section and a third solids collecting section in fluid communication with each other. A filtering assembly is retained within the second section and includes a filter panel having a generally vertically disposed filter media surface. Filtrate removal means applies vacuum pressure in communication with the filter panel such that filtrate is drawn through the pores of the filter media surface at a flow rate Qout. Cross flow means discharges liquid at a flow rate Qx vertically downward across the filter media surface, such that the horizontal velocity Vh of liquid drawn through the filter media surface is less than the vertical velocity Vv of the cross flowing liquid, wherein the vertical velocity Vv of the cross flowing liquid imparts downward force on particles to move or flush the particles downward past the filter media surface, preferably without adhering to the media surface, toward the solids collection section of the tank. The cross flow rate Qx must be greater than the filtrate flow rate Qout and recirculating means circulates liquid between the first and second sections of the tank. Passage means are provided for withdrawal of settled solids from the solids collecting section of the tank. In addition, skimming means can be provided for removing floating contaminants, such as oil or the like.

The apparatus operates to filter fluid through a filter assembly including a filter panel having a generally planar vertically disposed filter media surface with pores. Filtrate is drawn through the pores of the filter media surface at a flow rate Qout by application of vacuum pressure, preferably generated by the suction inlet of a fluid pump, disposed in communication with the filter panel. Fluid to be filtered is discharged at a flow rate Qx vertically downward across the filter media surface such that the horizontal velocity Vh of the fluid is less than the vertical velocity Vv of the fluid and the flow rate Qx is greater than the flow rate Qout. Unfiltered fluid is recirculated from below the filter panels to a fluid retaining section of the tank for subsequent recirculating discharge vertically downward across the filter media surface. The recirculating fluid flow from below the filter panels is subjected to an appreciable decrease in velocity, such that solids carried past the media surface are allowed to settle from the fluid to a solids collection section of the tank for removal.

Unfiltered fluid flow is discharged vertically downwardly through the generally vertical fluid flow passageway adjacent the filter media surface under vacuum having a generally horizontal cross sectional area Ah, wherein the vertical velocity Vv is as high as 10 feet per second and $Vv = (Qx/Ah) - Vh$. The horizontal velocity $Vh = Qout/Am$, where Am is the area of the filter media surface. The flow rate Qin of fluid to be filtered into the fluid retaining section of the tank is generally controlled such that Qin is approximately equal to Qout.

BRIEF DESCRIPTION OF THE DRAWINGS

The present invention will become more apparent by reference to the following detailed specification to be read in context with the attended drawings in which.

DESCRIPTION OF THE PREFERRED EMBODIMENTS

Figure 1:
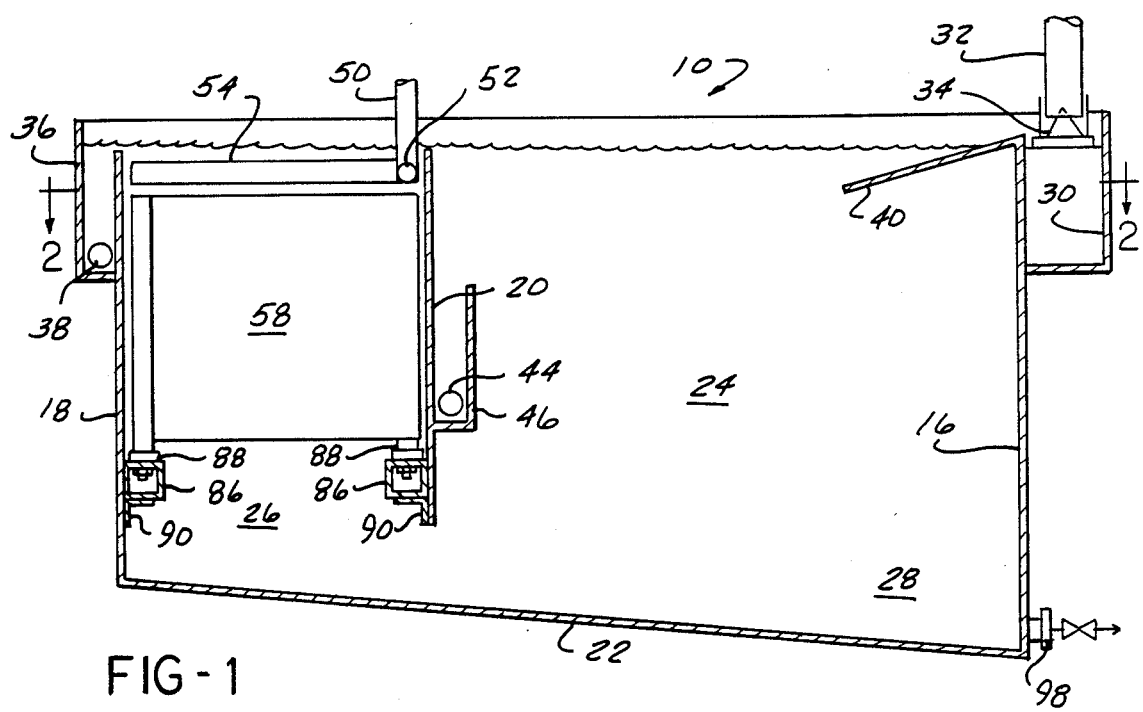
FIG. 1 is a cross sectional side elevational view of a filter apparatus embodying the present invention.
Figure 2:
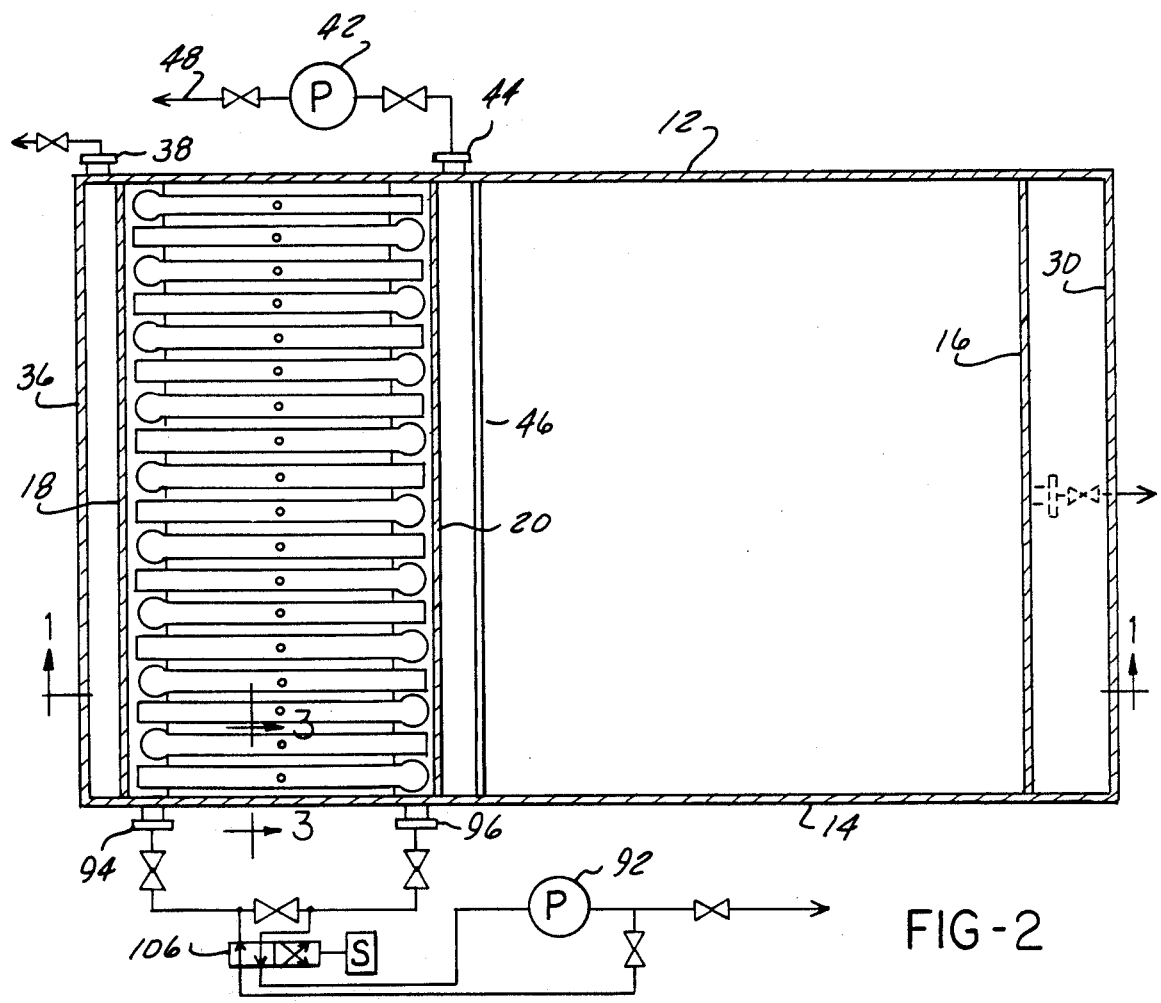
FIG. 2 is a cross sectional plan view taken substantially along the line 2—2 shown in FIG. 1, looking in the direction of the arrows.

One embodiment of the filter apparatus is depicted in FIGS. 1 and 2. The filter apparatus generally includes a tank 10 having two opposed side walls 12 and 14, and two opposed end walls 16 and 18. A downwardly extending baffle plate or wall 20 is disposed within the tank transversely between the two side walls 12 and 14 and spaced inwardly from the two end walls 16 and 18. The wall 20 extends from below the top of the tank 10 and terminates at a point disposed above the bottom 22 of the tank 10. The wall 20 generally divides the tank 10 into a first fluid retaining section 24 and a second filter retaining section 26 and allows floating oil or debris to flow from wall 16 to wall 18 by floating over wall 20. The bottom 22 of the tank 10 preferably is sloped to a low point and generally defines a solids collecting section 28 of the tank 10. The open area between the wall 20 and the bottom 22 of the tank 10 defines an under flow baffle arrangement through which unfiltered fluid and entrained solids can be recirculated to the fluid retaining section 24 of the tank 10. The relatively slow velocity of the fluid within the fluid retaining section 24 of the tank 10 allows solids to settle into the solids collection section 28 of the tank 10 for subsequent removal. The tank 10 also includes an unfiltered fluid inlet trough 30 which can be formed on the exterior of the tank 10 as shown in FIGS. 1 and 2, or alternately may be disposed within the tank 10 adjacent wall 16. As shown, a fluid inlet 32 discharges unfiltered fluid into the inlet trough 30 and subsequently overflows into the fluid retaining section 24 of the tank 10 on overflow baffle 40. In addition, the unfiltered fluid inlet flow may be controlled by valve means 34 for maintaining the fluid level below the top of tank 10. Floating contaminant removal means 36 are provided adjacent wall 18 in fluid communication with the tank 10. The floating contaminant removal means can comprise an overflow trough configuration disposed adjacent the top edge of tank 10 having a fluid outlet 38 for removal of the floating contaminants which overflow into the trough configuration when the fluid level rises slightly above the upper edge of the overflow trough. The overflow trough can be formed on the exterior of tank 10 as shown in FIGS. 1 and 2 allowing floating contaminants to overflow wall 18 into the trough for removal.

Preferably, a flow diverting baffle 40 is disposed within the fluid retaining section 24 of the tank 10. The flow diverting baffle 40 extends between the two side walls 12 and 14 and angles inwardly from the side wall 16. The baffle plate 40 diverts the circulating flow within the fluid retaining section 24 of the tank 10 to provide a relatively still region of fluid allowing contaminants lighter than water to remain on the surface.

Circulating pump means 42 draws unfiltered fluid from the fluid retaining section 24 of tank 10 through nozzle 44. Preferably, nozzle 44 is disposed adjacent the third wall 20 and is spaced both above the bottom edge of the third wall 20 and below the floating contaminant overflow trough. This position of the nozzle 44 in combination with the flow diverting baffle 40 provides for gentle mixing of the recirculated unfiltered fluid from the filter retaining section 26 with the unfiltered fluid inlet flow from trough 30 prior to being drawn into the circulating pump means 42. A trough-like configuration 46 extends between the two side walls 12 and 14 adjacent the nozzle 44 to reduce the likelihood of direct recirculation or short circuiting of unfiltered fluid flowing under wall 20 from the filter retaining section 26 of the tank 10. In addition, the trough wall 20 preferably extends at least as high as the top of the filter panels so that the panels are completely submerged prior to operation of the filter apparatus.

The circulating pump means 42 discharges unfiltered fluid into a fluid conduit or pipe 48 shown in FIG. 2 which is connected to a fluid dispersing assembly generally designated 50 shown in FIG. 1. The fluid dispersing assembly 50 is similar to that disclosed in my prior copending U.S. patent application Ser. No. 120,581 filed Nov. 19, 1987 which is incorporated herein by reference. The fluid dispersing assembly 50 in the present invention disperses unfiltered fluid in a vertically downward direction in the filter retaining section 26 of the tank 10. The fluid dispersing conduit assembly includes a header 52 in fluid communication with a plurality of dispersing conduits 54. Each dispersing conduit 54 has a plurality of openings 56 disposed vertically above and between adjacent filter panels 58.

Figure 3:
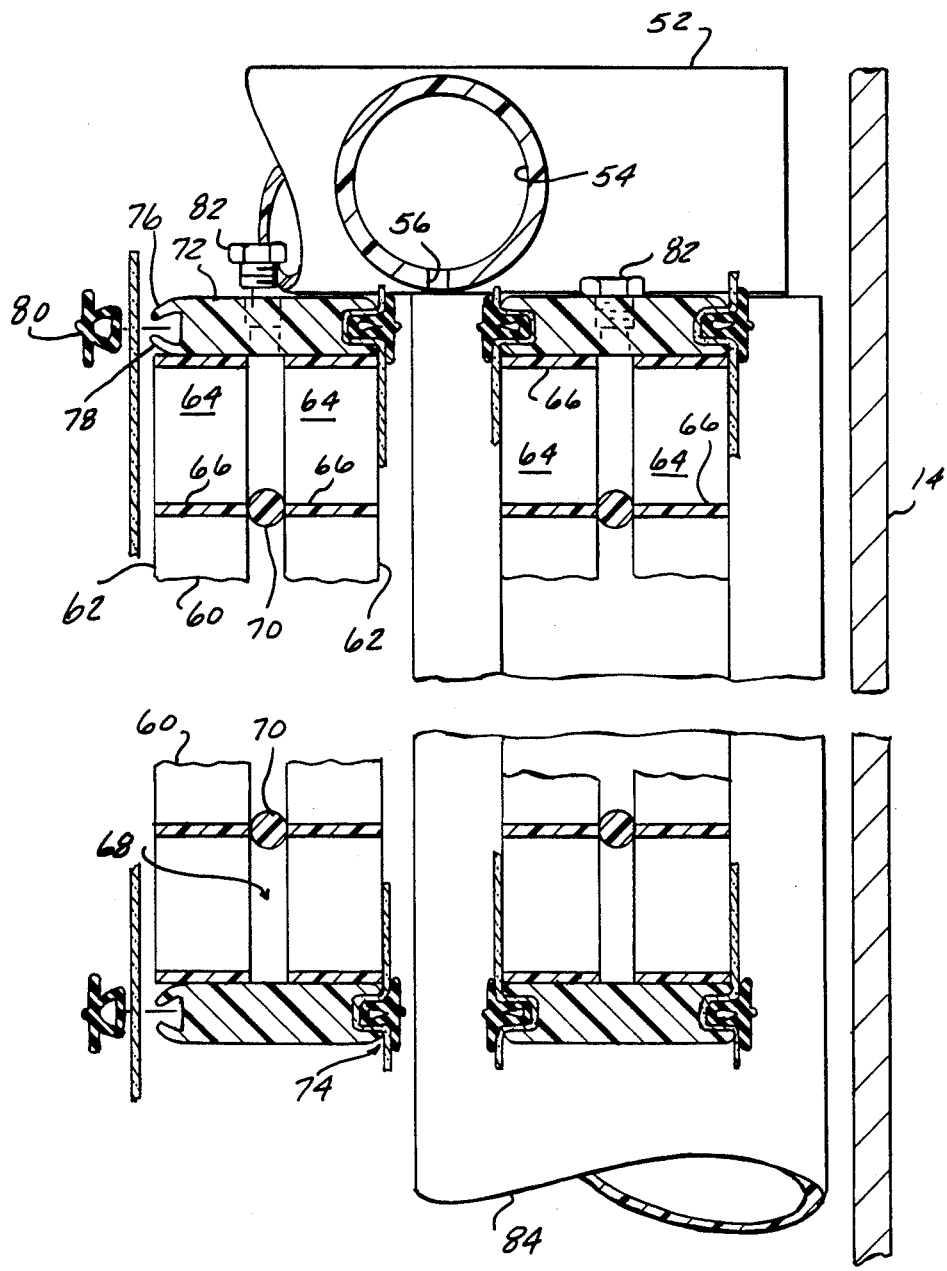
FIG. 3 is an enlarged view of the cross sectional area taken substantially on the line 3—3 shown in FIG. 2, looking in the direction of the arrows.

The preferred construction and configuration of the filter panels 58 has previously been disclosed in my prior co-pending U.S. patent applications Ser. No. 120,581 filed Nov. 19, 1987 which is U.S. Pat. No. 4,859,332; Ser. No. 024,383 filed Mar. 19, 1987 which is abandoned; and Ser. No. 932,010 filed Nov. 26, 1986 which is U.S. Pat. No. 4,790,935, are incorporated by reference in their entirety herein. The preferred embodiment of the filter panel 58 includes a rectangular panel structure 60 having spaced parallel filter supporting surfaces 62 disposed in vertical planes during normal use. Intersecting walls, 64 and 66 respectively, transversely extend between the spaced parallel filter supporting surfaces forming horizontal, vertical, and transverse passageways 68 for filtrate flow within the rectangular panel structure 60. As depicted in FIG. 3, the intersecting walls, 64 and 66 respectfully, may be disposed horizontally and vertically, while it should be recognized that other configurations of intersecting walls, 64 and 66 can be used to form horizontal, vertical and transverse fluid flow passageways through the rectangular panel structure 60.

As shown in FIG. 3, spacer members 70 may be disposed between two grid-like rectangular panels 60 to form an open horizontal and vertical passageway between the two panels in communication with the transverse passageway formed by the grid-like panel structure. The spacer members 70 are relatively short with respect to the length of the rectangular panel and are disposed spaced from one another allowing fluid flow of filtrate in both horizontal and vertical directions.

An alternative configuration of the rectangular panel structure 60 is constructed such that horizontal and vertical notches are formed in one side of the grid-like rectangular panel. Two of the grid-like panels are then secured together such that the horizontal and vertical notches form the horizontal and vertical passageways through the rectangular panel structure 60.

Referring now to FIGS. 3, peripheral frame means 72 enclose the edges of the rectangular panel structure 60 to seal the outer regions of the horizontal and vertical passageways from infiltration of unfiltered fluid. Preferably, the peripheral frame means 72 includes a filter media mounting means 74 for releasably sealing a filter media over the spaced parallel filter supporting surfaces. The filter media mounting means 74 generally includes opposed parallel inwardly inclined webs, 76 and 78 respectively, forming a groove extending around the entire periphery of the rectangular filter supporting surface 62 and adapted to receive the filter media. The filter media is held in place within the groove by a flexible sealing strip 80. Air release means 82 are provided on the top of the filter panel 58 for use while priming the filter panel 58 with clean fluid. The filter panel 58 also includes an outlet pipe 84 in fluid communication with the rectangular panel structure 60 vertically disposed along a vertical edge region of the rectangular panel structure 60. The outlet pipe 84 is in fluid communication with a manifold 86 through a pipe coupler 88, which allows each individual filter panel 58 to be readily removed by breaking the adhesive seal formed between the outlet pipe 84 and the pipe coupler 88. In addition, each of the manifolds 86 is removably supported on manifold supports 90, such that the entire filter assembly can be removed from the tank 10 for servicing.

Referring again to FIGS. 1 and 2, filtrate pump means 92 is in fluid communication with each of the manifolds 86 through manifold outlet nozzle 94 and 96 respectively. The suction inlet of the filtrate pump means 92 applies vacuum pressure to the interior of the filter panels 58 to draw filtrate through the pores of the filter media. Preferably, the suction or vacuum pressure of the filtrate pump means is maintained very low, preferably less than 1.0 inches vacuum pressure (mercury). The very low suction pressure reduces the likelihood of cavitation within the filtrate pump means 92, and eliminates the vacuum induced adhesion of particles covering the larger pores in the filter media surface. Since the particles are carried through the vertical passageway by the cross flow generally without adhering to the filter media surfaces, the operating cycle of the filtration apparatus is greatly increased by practically eliminating the need to remove or clean the particles from the filter media surface. A portion of the unfiltered fluid containing the entrained particles is recirculated into the fluid retaining section 24 of the tank 10. The particles are allowed to settle within this section of the tank due to the low velocity of the fluid and come to rest at the bottom of the tank in the solids collecting section 28. The settled solids may be removed from the bottom of the tank by any appropriate means, such as by a conveyor or by draining the settled solids through nozzle 98 and the appropriate piping into sludge collection bags. The sludge collection bags retain the solids while allowing any remaining fluid to drain off, thereby producing a drier sludge cake within the bag for disposal.

In operation, contaminated or unfiltered fluid is delivered to the tank 10 through inlet pipe 32. Water level control means 34 maintains the fluid level in tank 10 by controlling the amount of unfiltered fluid discharging into trough 30. The unfiltered fluid uniformly over flows the overflow weir onto baffle 40 and into the fluid retaining section 24 of the tank 10. Floating contaminants are allowed to remain on the surface and when an appropriate fluid level is reached, the floating contaminants overflow into the floating contaminant removal means 36 for removal through outlet nozzle 38. The unfiltered fluid is drawn through outlet nozzle 44 into the circulating pump means 42 for discharge through the dispersing assembly 50 in the filter retaining section 26 of the tank 10.

For illustration purposes, the dispersing conduit may take the form of 1¼ inch diameter pipes having ⅛ inch diameter holes spaced ½ inch on center from each other for discharging the unfiltered fluid in a straight vertically downward direction between the filter media surfaces of two adjacent filter panels 58. The vertically downward flow being controlled to achieve as much as 10 feet per second within the horizontal area defined by the vertical fluid passageway between the two adjacent filter panels 58. The cross flowing unfiltered fluid discharged through the dispersing assembly 50 flows completely through the vertical height of the filter panel 58 as filtrate is drawn through the pores of the filter media into the inner passageways of the rectangular panel structure 60. The filtrate is drawn from the rectangular panel structure 60 into the outlet pipe 84 through the pipe coupler 88 into the manifold 86 by the suction inlet of the filtrate pump means 92. The filtrate pump means 92 discharges the filtrate at any suitable location as desired. The excess cross flowing unfiltered fluid entrains particles in the cross flow stream and prevents the particles from adhering to the filter media surface as it continues vertically downward past the filter panels 58. The excess unfiltered fluid flow and entrained particles are recirculated back to the fluid retaining section 24, by under flowing wall 20 of the tank 10. As the unfiltered fluid flow velocity falls within the fluid retaining section 24, the solid particulates gradually settle due to the forces of gravity into the solids collecting section 28 of tank 10. The collected solids may be removed through solids discharge nozzle 98. A header can be attached to nozzle 98 to disperse the fluid held particulate into a series of filter bags attached thereto. The filtrate from the bags can be returned to the system. The recirculating unfiltered fluid gradually mixes with the incoming unfiltered fluid overflowing from trough 30 and is directed by baffle 40 toward the outlet nozzle 44 and recirculating pump means 42. The trough 46 being disposed adjacent the outlet nozzle 44 to reduce short circuiting of the recirculating unfiltered fluid flow from the filter retaining section 26 directly back into the circulating pump means 42. By way of non-limiting example, if the inlet flow of unfiltered fluid is approximately 700 gallons per minute, the cross flowing unfiltered fluid is appreciably greater than this having a flow rate of as much as three times the inlet flow or 2100 gallons per minute, while the filtrate flow approximately equals the inlet flow of unfiltered fluid at approximately 700 gallons per minute, and a recirculating unfiltered fluid flows under the wall 20 at a rate of as much as 1400 gallons per minute.

Figure 4:
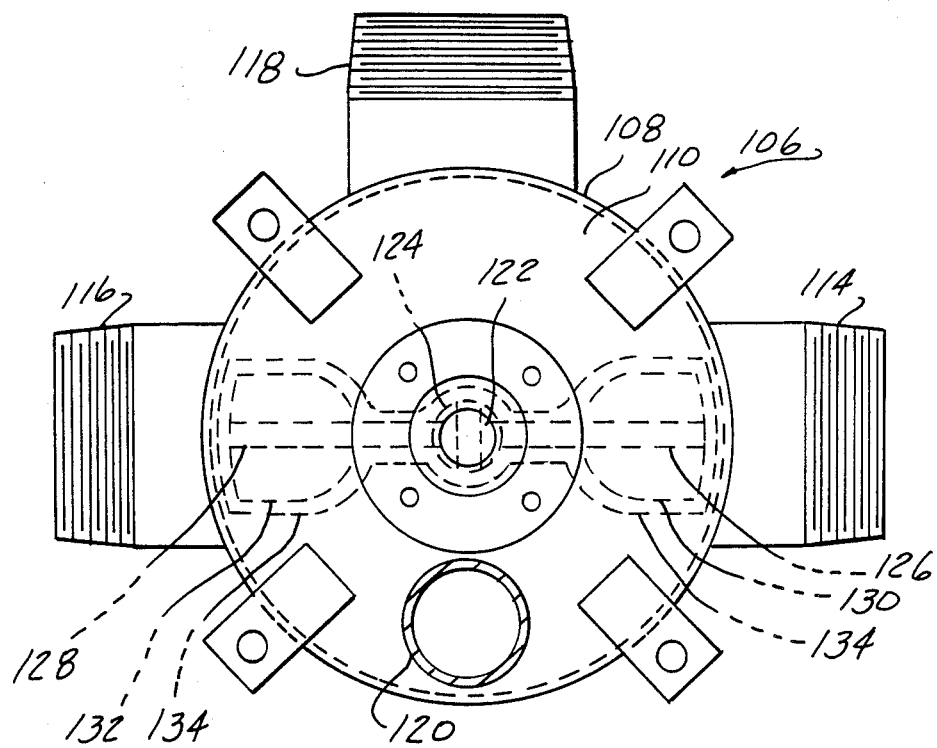
FIG. 4 is a plan view of a rotating valve for use between a filtrate pump and manifolds of the filter apparatus.
Figure 5:
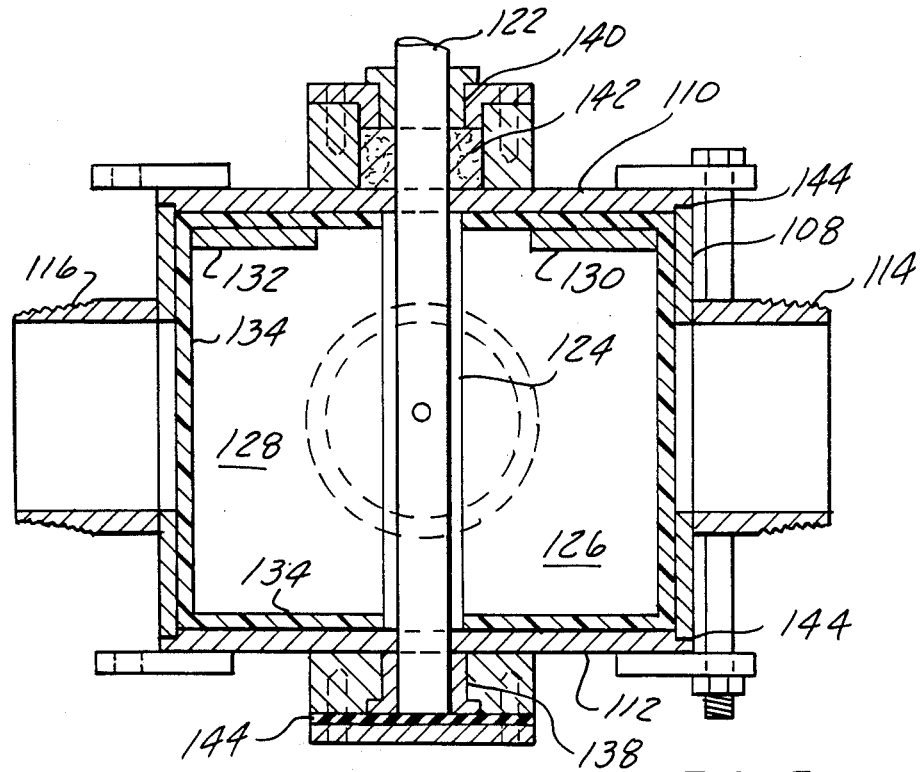
FIG. 5 is a cross-sectional view of the rotational valve shown in FIG. 4.

Referring now to FIGS. 4 and 5, there is shown an embodiment of the switch valve 106 which is schematically shown in the piping of FIG. 2. This embodiment of the switch valve 106 includes a cylindrical wall 108 having a first cover 110 at one end thereof and a second cover 112 at another end forming a chamber within the cylindrical wall 108. Manifold inlet 114 is in fluid communication with the chamber through wall 108 and is connected in fluid communication with one of the separate and independent manifolds 86. A second manifold inlet 116 is disposed in fluid communication with the chamber through wall 108 and is in fluid communication with the other manifold 86 through appropriate piping as can be seen in FIG. 2. Outlet 118 is in fluid communication with the chamber and is connected by appropriate piping to the suction inlet of the filtrate pump 92. A pressurized filtrate inlet 120 is disposed in fluid communication with the chamber and is connected by appropriate piping to the discharge outlet of the filtrate pump as shown schematically in FIG. 2. A shaft 122 passes through the chamber and is supported by cover plates 110 and 112 by means of bushings 138 and 140. Packing 142 is provided for the gland which includes the bushing 140 where the shaft 122 extends beyond the cover plate 110 for engagement by any suitable means for driving the switchable valve 106. Any appropriate driving means can be used in conjunction with the switch valve 106. The switch valve 106 can be driven in rotation about the axis of the shaft 122 which coincides with the longitudinal center line of the cylindrical wall 108. In the alternative, the switch valve 106 may be driven in angular oscillation between a first and second position by fluid actuated motor means or by electrically actuated reversible motor means. Sealing means 144 is provided where appropriate, such as to seal the bushing and support assembly connected to cover plate 122, and at the points of intersection between the cylindrical wall 108 and the first and second cover plates 110 and 112. A sleeve 124 is secured to the shaft 122 within the chamber. First and second planar plate members, 126 and 128 respectively, extend radially from opposite sides of the sleeve 124 spanning substantially the entire inside diameter of the cylindrical wall 108. Third and fourth plate-like members, 130 and 132 respectively, are fixedly connected to the plate members 126 and 128 respectively. The plate members 130 and 132 are disposed in a plane normal to the plane of the plate members 126 and 128 respectively, and are disposed adjacent the cover 110 through which the pressurized filtrate inlet 120 extends. The combination of the sleeve 124, the plate-like members 126, 128, 130 and 132 form a paddle wheel-like valve assembly. As depicted in FIG. 5, the valve assembly is covered with a coating 134 to provide peripheral sealing between the outer edges of the valve assembly and the walls of the chamber. However, it should be recognized that the valve assembly could be made entirely of a material having sealing properties, such as urethane, as opposed to just including a coating such as urethane or the like.

In operation, the valve assembly can be rotated within the chamber by any suitable driving means. By way of non-limiting example, the shaft 122 may be driven through an appropriate gear train by an electric motor which is controlled by a rheostat to provide rotation of the valve assembly at a selected rate, preferably falling within the range of 0 to 20 revolutions per minute. As the valve rotates, for instance, clockwise from the position shown in FIG. 4, the peripheral edges of the valve assembly seal against the outer walls of the chamber to divert filtrate flow from a first one of the manifolds 86 through manifold inlet 114 and out of the outlet 118 to the filtrate pump 92. A small portion of pressurized filtrate flow is returned from the discharge of the filtrate pump 92 and into inlet 120 to pressurize the filter panels associated with the other manifold 86 connected through the manifold inlet 116. This portion of the pressurized filtrate is used to eliminate the vacuum pressure previously applied to the filter panels associated with the manifold connected to manifold inlet 116, and it is not required that the pressure and flow be sufficient to backwash the filters. Rather, the pressure is less than the bubble pressure required to force fluid through the media surface of the filter media, and therefore, relieves the vacuum pressure on the filter media allowing the cross flowing stream to flow past the media surface without drawing any filtrate flow for a period of time. As the valve assembly continues to rotate, the plate-like member 130 covers the pressurize filtrate inlet 120, as the plate member 128 opens both manifold inlets into communication with the outlet 118, thereby allowing the filtrate pump 92 to draw from both filter panel manifolds for a short period of time. As the valve assembly continues to rotate, the manifold inlet 114 is placed in fluid communication with the pressurized filtrate inlet 120 to eliminate the vacuum pressure within this set of filter panels for a period of time, while the other set of filter panels is in fluid communication through manifold inlet 116 with the filtrate pump 92 through outlet 118. When the valve assembly has rotated 180°, it is again in the position as shown in FIG. 4 of the drawings. In this position, all three inlets, 114, 116 and 120, are in fluid communication with the outlet 118. Of course, it should be apparent that if it is desired to close the pressurized filtrate inlet 120 while in this position, additional plate-like members can be supported from the sleeve 124 in similar positions to plates 130 and 132 with the exception of being offset from plates 130 and 132 by a 90° rotation. In the alternative, the valve assembly can be rotated angularly about the axis of shaft 22 in an oscillatory manner through an arc of approximately 90° from a first position corresponding approximately to ten o'clock when viewing the valve assembly as depicted in FIG. 4 to a second position corresponding to approximately two o'clock, and returning back to the ten o'clock position in reverse direction through the same 90° arc. This oscillatory motion would alternate the connection of the outlet 118 with the inlets 114 and 116, while at the same time alternating the connection of the pressurized filtrate inlet 120. When operating in this manner, it should be apparent that only one of the plate-like members 130 and 132 is required to perform the function of closing the pressurized filtrate inlet 120 when switching the fluid connection of the outlet 118 from one manifold inlet to the other.

The vacuum-type filter panels will process hundreds of gallons per minute of submicron filtrate while requiring a relatively small amount of floor space. The filter panel arrangement using two filtrate manifolds connected to the suction of a centrifugal pump provides a continuously self-cleaning filter. The system can be configured, if desired, to switch the filtrate flow back and forth between the two filtrate manifolds. While alternate sets of filter panels are under suction pressure, adjacent filter panels can be subjected to cross flowing fluid and may also be subjected to backwash pressure, if desired and appropriately configured using the piping schematically shown in FIG. 2, in the self-cleaning cycle. In FIG. 2, a small tube carries filtrate from the discharge side of pump 92 to the manifold not under vacuum through a switchable valve 106, which can be operable in response to a timer, pressure gauge or the like.

The cross-flow of the feed stream is perpendicular to the filtrate flow and entrains the solids past the media surface for deposit in the solids-collection section adjacent the bottom of the filter apparatus. These entrained solids flow continuously to a fluid-retaining section of the tank where the cleanest portion is returned to the feed stream to add impetus to the cross-flow. This produces a true cross flow filter apparatus since the cross flowing fluid stream is continuously recirculating past the filter panels. The filter panels generally weigh less than one pound per square foot of filter area and can be removed and replaced in a very short period of time. The cross flow filter apparatus can be used for oil/water separation, waste treatment, food and beverage, car wash, solvent reclamation, and sewage treatment among other applications. The cross flow filter apparatus requires sufficient filter area to provide the filtrate flow rate desired while maintaining the very low vacuum pressure on the filter media as previously described. Other filtrate flows can be achieved depending on the media selected, which is suitable for the particular application. Submicron filter medias provide increased single stage filtering efficiency and are the preferred filtering media, because the submicron pores prevent the intrusion of particles to be filtered into the pores, thereby eliminating a major cause of filter shut down and servicing due to clogged filter media. Instead of becoming lodged within the pore openings, or resting on the surface of the media, the particles are kept moving past the media surface, thereby allowing extended filtration cycles between shut down and servicing.

Having disclosed certain preferred embodiments of my invention for purposes of explanation, further modifications or variations thereof, after study of this specification, will or may occur or become apparent to persons skilled in the art to which the invention pertains. It should be recognized that the present invention is not meant to be limited to submicron filtering and reference should be made to the appendant claims in determining the scope of the present invention.

The invention claimed is:

1. A filtration method for a liquid comprising the steps of:
   filtering a liquid through a filter assembly disposed in a filter retaining section of a tank, said filter assembly including a filter panel having a generally planar vertically disposed filter media surface with pores;
   applying vacuum pressure in communication with the filter panel to draw liquid filtrate through the pores of the filter media surface at a flow rate $Q_{out}$;
   drawing liquid from a liquid retaining section of the tank in fluid communication with the filter retaining section of the tank;
   cross flowing the liquid drawn from the liquid retaining section of the tank vertically downward across the filter media surface, such that the horizontal velocity $V_h$ of the liquid is less than the vertical velocity $V_v$ of the liquid, the liquid cross flowing at a flow rate of $Q_x$ while filtering, wherein $Q_x$ is greater than $Q_{out}$;

recirculating liquid from below the filter assembly in the filter retaining section of the tank to the liquid retaining section of the tank;

settling particles from the liquid in the liquid retaining section of the tank by gravitational forces;

accumulating the settled particles in a solids collection section of the tank in fluid communication with the liquid retaining section of the tank;

drawing filtrate from a first manifold inlet in fluid communication with a first filter panel under vacuum pressure from a suction inlet of a pump, while applying positive pressure through a pressurized inlet to a second separate and independent manifold inlet in fluid communication with a second filter panel for a period of time;

closing the pressurized inlet while communicating the suction inlet of the pump simultaneously with both the first and second manifold inlets for a period of time; and applying positive pressure to the first manifold inlet while the suction inlet of the pump draws filtrate from the second manifold inlet for a period of time.

2. The filtration method of claim 1, further comprising the step of:

removing the settled particles from the solids collection section of the tank.

3. The filtration method of claim 1, wherein Qx is at most three times Qout.

4. The filtration method of claim 1, wherein the vacuum is less than 1.0 inches of Mercury.

5. A filtration method for a liquid comprising the steps of:

filtering a liquid through a filter assembly disposed in a filter retaining section of a tank, said filter assembly including a filter panel having a generally planar vertically disposed filter media surface with pores;

applying vacuum pressure in communication with the filter panel to draw liquid filtrate through the pores of the filter media surface at a flow rate $Q_{out}$;

drawing liquid from a liquid retaining section of the tank in fluid communication with the filter retaining section of the tank;

cross flowing the liquid drawn from the liquid retaining section of the tank vertically downward across the filter media surface, such that the horizontal velocity $V_h$ of the liquid is less than the vertical velocity $V_v$ of the liquid, the liquid cross flowing at a flow rate of $Q_x$ while filtering, wherein $Q_x$ is greater than $Q_{out}$;

recirculating liquid from below the filter assembly in the filter retaining section of the tank to the liquid retaining section of the tank;

settling particles from the liquid in the liquid retaining section of the tank by gravitational forces;

accumulating the settled particles in a solids collection section of the tank in fluid communication with the liquid retaining section of the tank; and alternately switching the applied vacuum pressure between first and second separate and independent manifolds in fluid communication with first and second filter panels respectively at predetermined intervals.

6. The filtration method of claim 5 further comprising the step of:

applying positive pressure selectively to one of the first and second manifolds alternating with the applied vacuum pressure, such that one of the manifolds is under vacuum pressure while the other of the maniifolds is under positive pressure.

7. The filtration method of claim 6 wherein switching vacuum pressure simultaneously switches positive pressure between the two manifolds.

8. The method of claim 5, further comprising the step of:

removing floating contaminants from the liquid to be filtered.

9. The method of claim 5, further comprising the step of:

removing solids settled from the liquid to be filtered.

10. The method of claim 5, further comprising the step of:

controlling the delivery of liquid to be filtered at a flow rate $Q_{in}$.

11. The method of claim 5, further comprising the step of:

diverting liquid to be filtered through a narrow generally vertical fluid flow passageway adjacent the filter media surface having a generally horizontal cross section $A_h$ such that the vertical velocity $V_v$ is at most 10 feet per second, wherein $V_v = (Q_x/A_h) - V_h$ and $V_h = Q_{out}/A_m$ where $A_m$ is an area of the filter media surface.

12. A method for cross flow filtration of fluid comprising the steps of:

filtering fluid through a filter assembly including first and second filter panels having a generally planar vertically disposed filter media surface with pores;

drawing filtrate through the pores of the filter media surface at a flow rate $Q_{out}$ by application of vacuum pressure in communication with the filter panel;

circulating fluid at a flow rate $Q_x$ vertically downward across the filter media surface, such that the horizontal velocity $V_h$ of the fluid is less than the vertical velocity $V_v$ of the fluid, wherein $Q_x$ is greater than $Q_{out}$; and alternately switching the applied vacuum pressure between first and second separate and independent manifolds having first and second inlets in fluid communication with said first and second filter panels respectively at predetermined intervals.

13. The method of claim 12, further comprising the step of:

recirculating fluid from below the filter panels back through the circulating step.

14. The method of claim 12, further comprising the step of:

removing floating contaminants from the fluid to be filtered.

15. The method of claim 12, further comprising the step of:

removing solids settled from the fluid to be filtered.

16. The method of claim 12, further comprising the step of:

controlling the delivery of fluid to be filtered at a flow rate Qin.

17. The method of claim 12, further comprising the step of:

diverting fluid flow to be filtered through a narrow generally vertical fluid flow passageway adjacent the filter media surface having a generally horizontal cross section Ah such that the vertical velocity Vv is approximately 9 feet per second, wherein $Vv=(Qx/Ah)-Vh$ and $Vh=Qout/Am$ where Am is an area of the filter media surface.

18. The filtration method of claim 12 further comprising the step of:

applying positive pressure selectively to one of the first and second manifolds alternating with the applied vacuum pressure, such that one of the manifolds is under vacuum pressure while the other of the manifolds is under positive pressure.

19. The filtration method of claim 18 wherein switching vacuum pressure simultaneously switches positive pressure between the two manifolds.

20. The filtration method of claim 12 further comprising the steps of:

drawing filtrate from the first manifold unlet in fluid communication with the first filter panel under vacuum pressure from a suction inlet of a pump, while applying positive pressure through a pressurized inlet to the second separate and independent manifold inlet in fluid communication with the second filter panel for a period of time;

closing the pressurized inlet while communicating the suction inlet of the pump simultaneously with both the first and second manifold inlets for a period of time; and applying positive pressure to the first manifold inlet while the suction inlet of the pump draws filtrate from the second manifold inlet for a period of time.

* * * * *